United States Patent
Mencel, Jr. et al.

(10) Patent No.: US 10,675,798 B2
(45) Date of Patent: Jun. 9, 2020

(54) LIQUID SHIM ADHESIVE INJECTION TOOL

(71) Applicant: Sikorsky Aircraft Corporation, Stratford, CT (US)

(72) Inventors: Joseph W. Mencel, Jr., Easton, CT (US); Jordash Shane Garraway, Bridgeport, CT (US); Karl M. Sweeten, Colchester, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 289 days.

(21) Appl. No.: 15/533,509

(22) PCT Filed: Dec. 22, 2015

(86) PCT No.: PCT/US2015/067397
§ 371 (c)(1),
(2) Date: Jun. 6, 2017

(87) PCT Pub. No.: WO2016/106325
PCT Pub. Date: Jun. 30, 2016

(65) Prior Publication Data
US 2017/0361352 A1    Dec. 21, 2017

Related U.S. Application Data

(60) Provisional application No. 62/095,466, filed on Dec. 22, 2014.

(51) Int. Cl.
*B29C 45/14* (2006.01)
*B29C 65/54* (2006.01)
(Continued)

(52) U.S. Cl.
CPC ........ *B29C 45/14508* (2013.01); *B05C 5/027* (2013.01); *B05C 5/0254* (2013.01);
(Continued)

(58) Field of Classification Search
CPC ..... B05C 5/0254; B05C 5/027; B05C 5/0291; B29C 2045/14532; B29C 2045/1454;
(Continued)

(56) References Cited

U.S. PATENT DOCUMENTS

T889,025 I4 * 8/1891 Ulmschneider et al. ...................
B29C 45/14467
156/159
2,392,734 A * 1/1946 Haberstump .......... B27G 11/00
52/284
(Continued)

FOREIGN PATENT DOCUMENTS

JP 06339946 A * 12/1994
WO WO-2014199968 A1 * 12/2014 ....... B29C 45/14467

OTHER PUBLICATIONS

Notification of Transmittal of the International Search Report for International Application No. PCT/US15/67397; International Filing Date: Dec. 22, 2015; dated Mar. 7, 2016; 11 pages.
(Continued)

*Primary Examiner* — Benjamin A Schiffman
(74) *Attorney, Agent, or Firm* — Cantor Colburn LLP

(57) ABSTRACT

A tool for installing a liquid shim material into a clearance formed between an assembly first and second component includes a body having a first end and a second end. The first end includes a planar surface and the second end includes a first surface and a second surface arranged at an angle to the first end and to one another. At least one hole is formed in the body. The at least one hole extends from the first end to the second end and is configured to provide a passageway through the body. The tool is arranged adjacent the assembled first and second component such that the passageway formed by the at least one hole is arranged in fluid communication with the clearance.

6 Claims, 4 Drawing Sheets

(51) Int. Cl.

| | |
|---|---|
| *B05C 17/005* | (2006.01) |
| *F16B 11/00* | (2006.01) |
| *B29C 33/12* | (2006.01) |
| *B29C 33/00* | (2006.01) |
| *B05C 5/02* | (2006.01) |
| *B29C 65/52* | (2006.01) |
| *B29C 65/70* | (2006.01) |

(52) U.S. Cl.
CPC ...... *B05C 5/0291* (2013.01); *B05C 17/00503* (2013.01); *B05C 17/00516* (2013.01); *B29C 33/0061* (2013.01); *B29C 33/12* (2013.01); *B29C 45/14467* (2013.01); *B29C 65/524* (2013.01); *B29C 65/525* (2013.01); *B29C 65/542* (2013.01); *B29C 65/70* (2013.01); *F16B 11/006* (2013.01); *B29C 2045/1454* (2013.01); *B29C 2045/14532* (2013.01)

(58) Field of Classification Search
CPC ........ B29C 45/14467; B29C 45/14508; B29C 65/524; B29C 65/525; B29C 65/542; B29C 65/70
See application file for complete search history.

(56) References Cited

U.S. PATENT DOCUMENTS

| | | | | |
|---|---|---|---|---|
| 3,893,777 | A | * | 7/1975 | Jones .................. B29C 66/112 403/268 |
| 4,183,778 | A | * | 1/1980 | Mesnel ............ B29C 45/14467 156/245 |
| 4,386,998 | A | * | 6/1983 | McIntyre .............. B05C 5/0254 118/123 |
| 4,980,005 | A | | 12/1990 | Scollard |
| 5,409,733 | A | * | 4/1995 | Boger .................. B05B 7/0861 118/324 |
| 6,415,826 | B1 | | 7/2002 | Della Vecchia |
| 2005/0271806 | A1 | * | 12/2005 | Ganzer ................ B05C 5/0212 427/207.1 |
| 2006/0162859 | A1 | | 7/2006 | Pridie |
| 2008/0277926 | A1 | * | 11/2008 | Inman, Jr. ............ A61M 39/10 285/123.15 |
| 2010/0242256 | A1 | | 9/2010 | Gorr et al. |
| 2013/0011552 | A1 | | 1/2013 | Bondeson et al. |
| 2013/0294924 | A1 | | 11/2013 | Mathon et al. |

OTHER PUBLICATIONS

Written Opinion of the International Searching Authority for International Application No. PCT/US15/67397; International Filing Date: Dec. 22, 2015; dated Mar. 7, 2016; 6 pages.

* cited by examiner

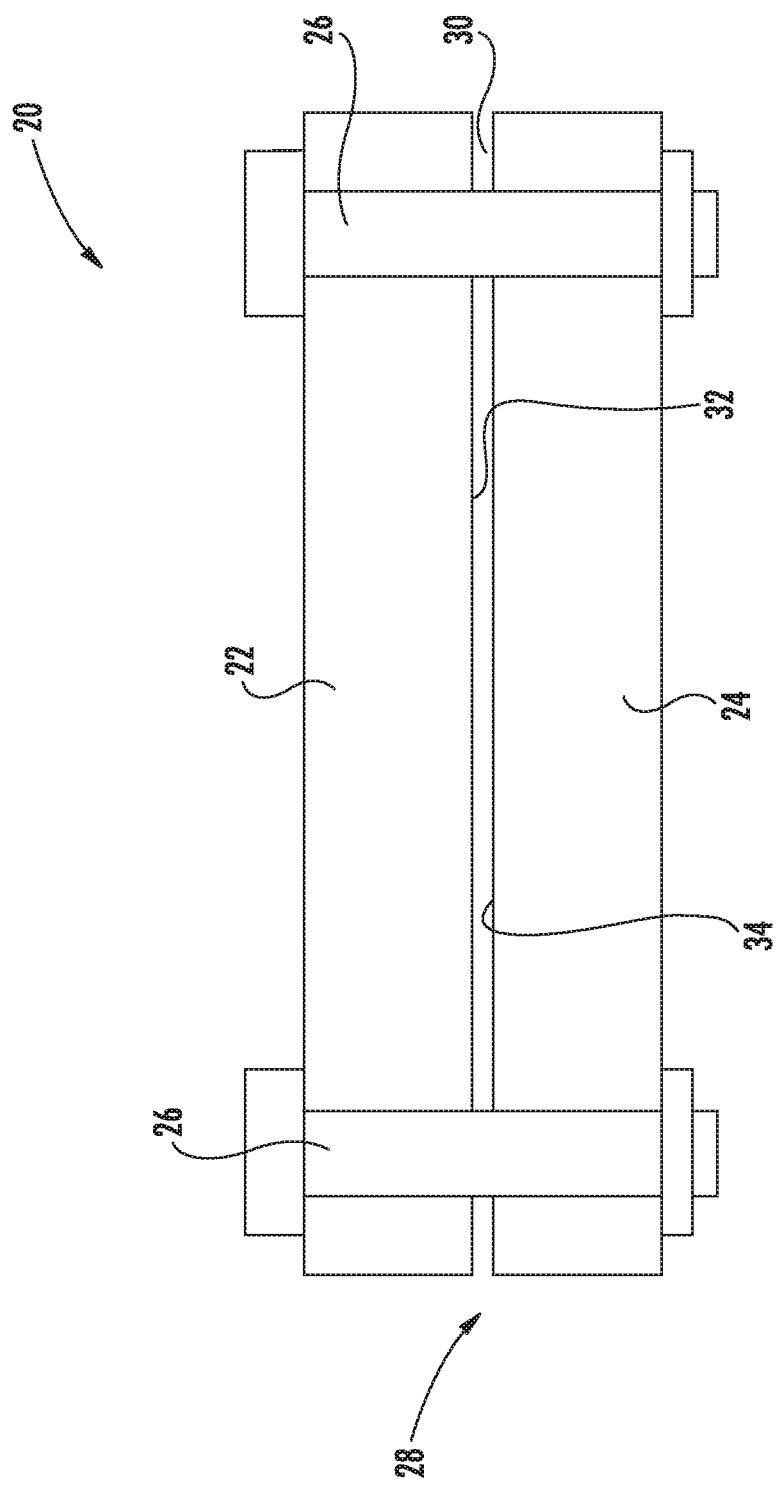

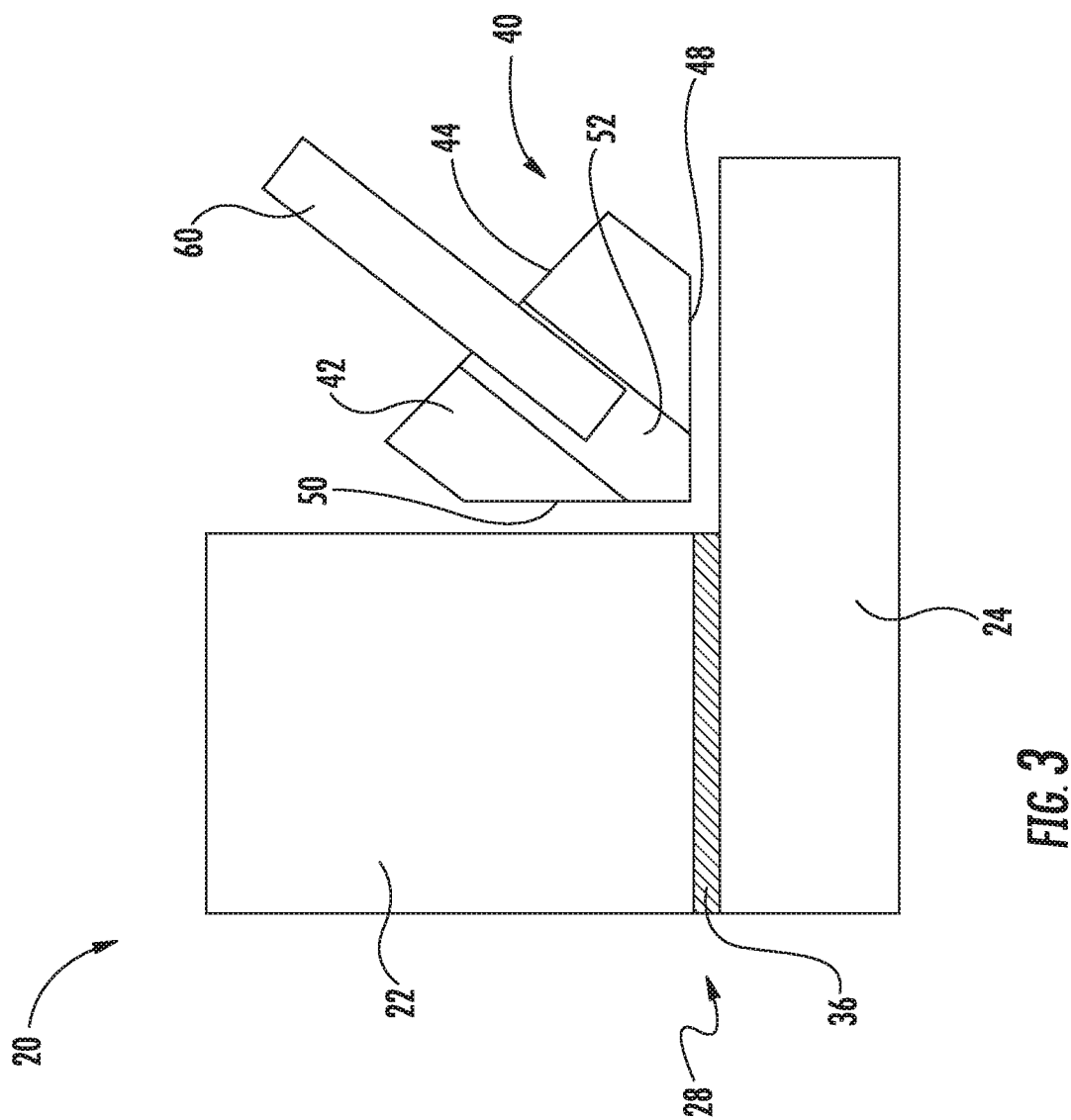

LIQUID SHIM ADHESIVE INJECTION TOOL

CROSS REFERENCE TO RELATED APPLICATIONS

This application is a National Stage application of PCT/US2015/067397, filed Dec. 22, 2015, which claims the benefit of U.S. Provisional Application No. 62/095,466, filed Dec. 22, 2014, both of which are incorporated by reference in their entirety herein.

BACKGROUND OF THE INVENTION

Exemplary embodiments of the invention disclosed herein relate to aircraft structures, and more particularly, to application of a liquid shim material between adjoining aircraft components.

Interfaces between adjoining components of aircraft structures often require the application of a liquid shim to seal gaps between the components due to manufacturing tolerances. Typical materials used as liquid shims include curing methyl methacrylate adhesives, urethanes and epoxies. Application of the liquid shim at such interfaces can be a difficult and time-consuming process. A liquid shim is typically applied to one or both components prior to assembly. The components are then assembled and the liquid shim cures to the desired thickness. Features of the final assembly, such as fastener holes for example, are then formed in the fittings, through the cured liquid shim. The fasteners are then installed as required to secure the components at the interface with the liquid shim therebetween.

BRIEF DESCRIPTION OF THE INVENTION

According to one aspect of the invention, a tool for installing a liquid shim material into a clearance formed between an assembly first and second component includes a body having a first end and a second end. The first end includes a planar surface and the second end includes a first surface and a second surface arranged at an angle to the first end and to one another. At least one hole is formed in the body. The at least one hole extends from the first end to the second end and is configured to provide a passageway through the body. The tool is arranged adjacent the assembled first and second component such that the passageway formed by the at least one hole is arranged in fluid communication with the clearance.

In addition to one or more of the features described above, or as an alternative, in further embodiments a diameter of the at least one hole adjacent the first end is greater than or equal to a diameter of an injector nozzle.

In addition to one or more of the features described above, or as an alternative, in further embodiments a diameter of the at least one hole remains constant between the first end and the second end.

In addition to one or more of the features described above, or as an alternative, in further embodiments the angle between the first surface and the second surface is generally complementary to an interface between the first component and the second component.

In addition to one or more of the features described above, or as an alternative, in further embodiments the angle between the first surface and the second surface of the second end is about 90 degrees.

According to another embodiment of the invention, a method of installing a liquid shim material into a clearance formed between an assembled first component and second component includes installing a tool adjacent an interface between the first component and the second component. The tool includes at least one hole configured to provide a passageway there through. The passageway is arranged in fluid communication with the clearance. An injector nozzle is inserted into the at least one hole. A supply of liquid shim material is directed through the passageway and into the clearance.

In addition to one or more of the features described above, or as an alternative, in further embodiments installing the tool includes bonding the tool in position adjacent the interface of the first component and the second component.

In addition to one or more of the features described above, or as an alternative, in further embodiments the tool is separated from the interface of the first component and the second component.

In addition to one or more of the features described above, or as an alternative, in further embodiments the tool includes a plurality of holes. The injector nozzle directs a supply of liquid shim material through the passageway of each of the plurality of holes into the clearance sequentially.

In addition to one or more of the features described above, or as an alternative, in further embodiments the tool includes a plurality of holes. The injector nozzle is configured to direct a supply of liquid shim material through the passageway of two or more of the plurality of holes simultaneously.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 is a cross-sectional view of an assembly including a first component and a second component according to an embodiment of the invention;

FIG. 3 is a cross-sectional view of the tool when being used to direct a flow of a liquid shim material into a clearance of an assembly according to an embodiment of the invention.

Figure 2B:
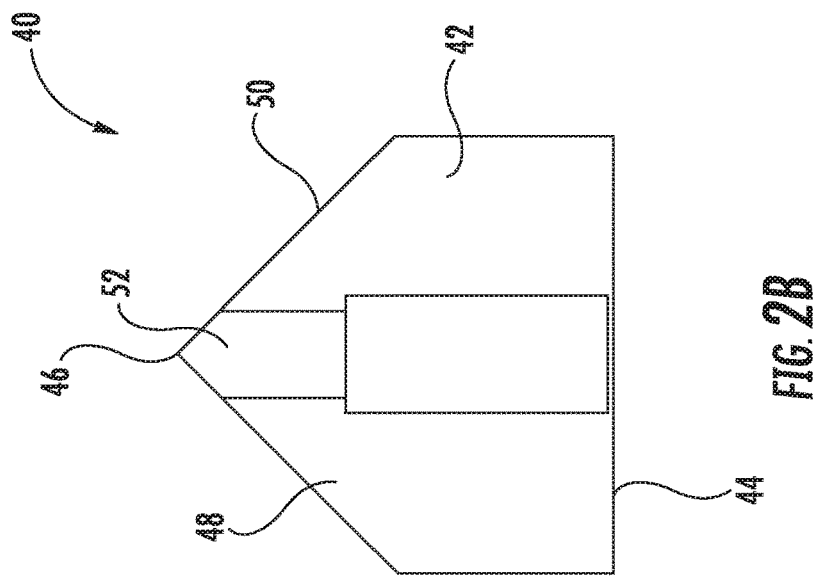
FIG. 2b is a cross-sectional view of the tool of FIG. 2a taken along line A-A according to an embodiment of the invention.

The detailed description explains embodiments of the invention, together with advantages and features, by way of example with reference to the drawings.

DETAILED DESCRIPTION OF THE INVENTION

Referring now to FIG. 1, an example of an assembly 20 includes a first component 22 and a second component 24 secured to one another, such as with a plurality of fasteners 26 for example. In some embodiments, the first component 22 and the second component 24 are aircraft components, for example, fittings, ducts, or external skin components. In some embodiments, the first component 22 and the second component 24 are formed from the same material, or similar materials. In other embodiments, the first component 22 is formed from a material different or dissimilar from the second component 24. For example, the first component 22 may be formed from a metallic material such as an aluminum or aluminum alloy, while the second component 24 may be formed from a non-metallic material such as graphite or a composite material.

In some instances, a small clearance or gap 30 exists between the first component 22 and the second component 24 when the components are assembled. In one embodiment, the gap 30 at the interface 28 between the first and second component 22, 24 has a thickness between about 0.002 inches and about 0.008 inches. A liquid shim material 36 (see FIG. 3) may be utilized to eliminate the gap 30 due to, for example, manufacturing tolerances of the first component 22 and/or the second component 24, between the first facing surface 32 and the second facing surface 34 when the first component 22 is assembled to the second component 24. Examples of the liquid shim material include methyl methacrylate adhesives, urethane, and epoxy for example.

To install the liquid shim material 36 into the clearance 30 formed at the interface 28 of the assembled first and second component 22, 24, the liquid shim material 36 is typically injected therein under pressure. However, because a diameter of the needle 60 used to inject the liquid shim material 36 is substantially larger than the size of the clearance 30, it is difficult to direct the liquid shim material 36 into the clearance 30 without separating the components 22, 24 of the assembly 20.

Figure 2A:
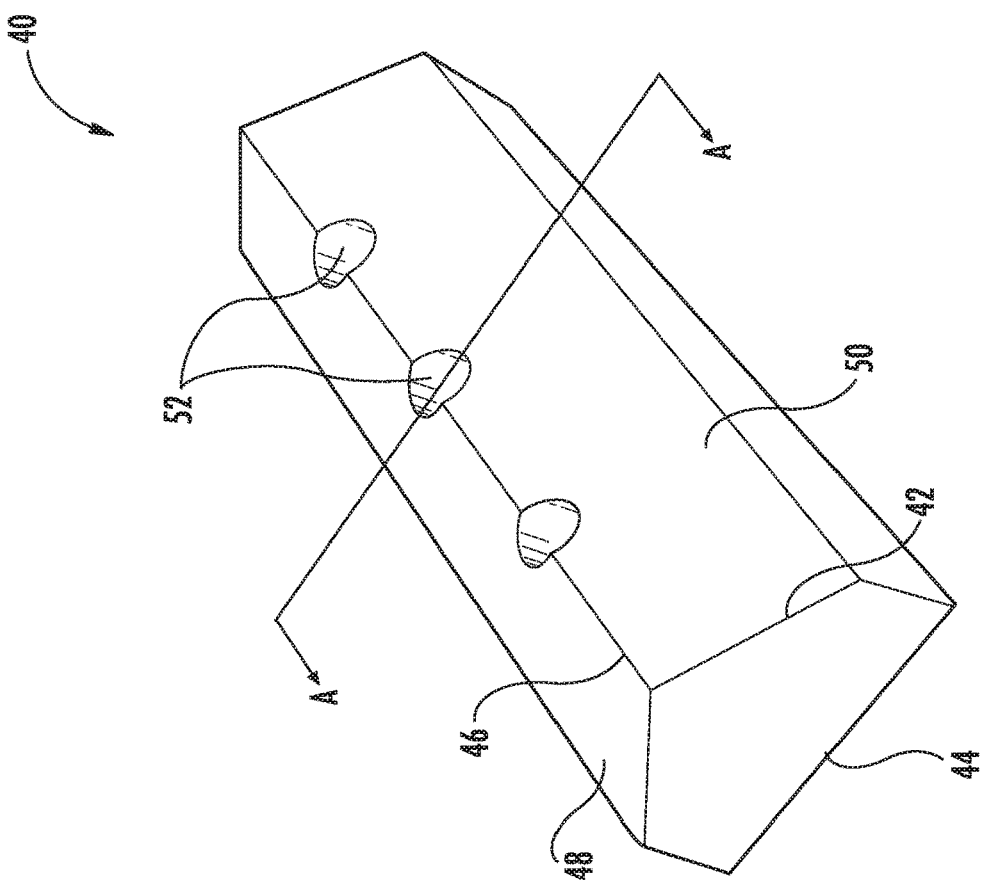
FIG. 2a is a tool configured to direct a flow of a liquid shim material into a clearance of an assembly according to an embodiment of the invention.

Referring now to FIG. 2, an example of a tool 40 configured to direct a liquid shim material 36 into a small clearance 30 of an assembly 20 is illustrated in more detail. The tool 40 includes a body 42 formed from a solid piece of material, such as metal or plastic for example. A first end 44 of the tool 40 is generally planar and a second, opposite end 46 of the tool includes a first and second surface 48, 50 arranged substantially at an angle to the first end 44 and to one another. Although the first and second surfaces 48, 50 are illustrated as being perpendicular to one another, embodiments where the first and second surfaces 48, 50 are arranged at other angles complementary to the interface 28 between the first and second components 22, 24 are within the scope of the invention. In one embodiment, a length of the tool 40 is substantially equal to a length of the interface 28 between the first component 22 and the second component 24.

At least one hole 52 extends through the interior of the tool 40 from the first end 44 to the second end 46. The hole 52 is configured to provide a passageway extending through the tool 40 to the clearance 30 for allowing introduction of the liquid shim material 36 through the tool 40. In embodiments where the tool 40 has an extended length, a plurality of holes 52, such as spaced equidistantly from one another for example, may be formed in the body 42 of the tool 40. The number of holes 52, and therefore passageways, may be selected to allow the liquid shim material 36 to spread within the clearance 30 to the extent required. Usually it is desirable for the liquid shim material 36 to form a continuous layer such that the clearance 30 between the first component 22 and the second component 24 is completely filled.

A diameter of each hole 52 may be substantially constant, as shown in FIG. 3, or alternatively, may vary over the height of the tool 40 (FIG. 2b). The diameter of the hole 52 adjacent the first end 44 is at least equal to a diameter of a complementary liquid shim injector nozzle 60 such that the injector nozzle 60 may be at least partially received therein.

Figure 4:
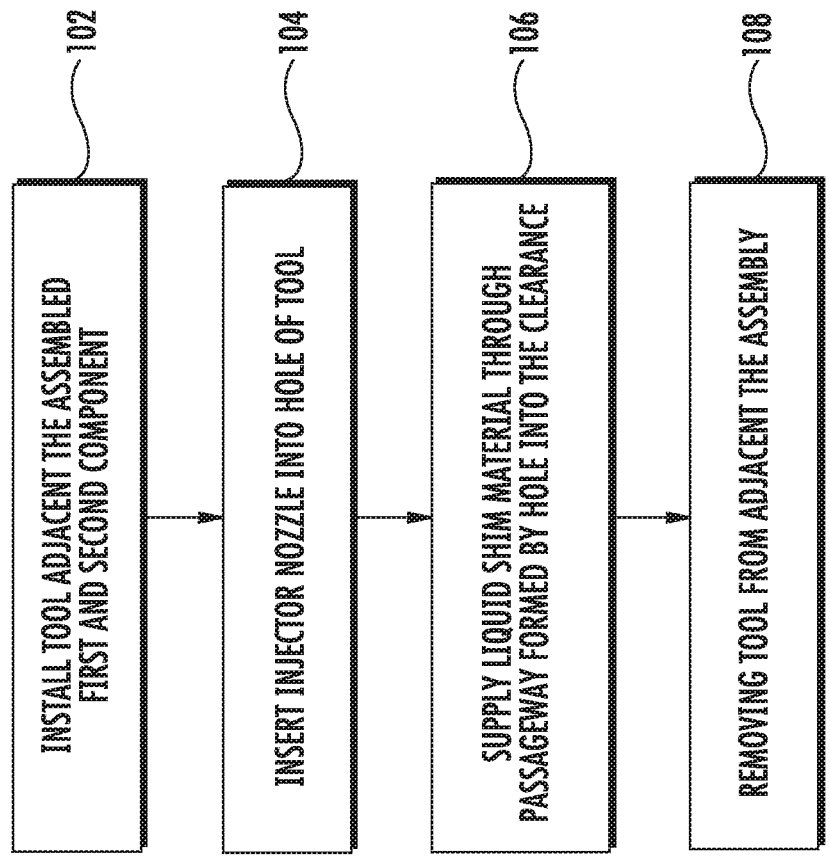
FIG. 4 is a flow diagram of a method of installing a liquid shim material within a clearance of an assembly according to an embodiment of the invention.

A method 100 of installing the liquid shim material 36 within the clearance 30 between a first component 22 and a second component 24 of an assembly 20 is illustrated in more detail in FIGS. 3 and 4. In block 102, the tool 40 is generally positioned near the assembly 20 such that the first and second surfaces 48, 50 of the second end 46 are substantially parallel to and in contact with the adjacent surfaces of the first and second component 22, 24, as shown in FIG. 3. In this position, a portion of each of the one or more holes 52 formed in the tool 40 is substantially aligned with the clearance 30 between the first and second components 22, 24. To prevent the tool 40 from sliding relative to the assembly 20, the tool 40 may be temporarily bonded adjacent the interface 28.

Once in position, an injection needle 60 is inserted into one or more of the holes 52 of the tool 40, as shown in block 104, and liquid shim material 36 is delivered via pressure into the clearance 30 as shown in block 106. In embodiments where the tool 40 includes a plurality of holes 52, a single injection nozzle 60 may be used to supply the liquid shim material 36 into the clearance 30 via each hole 52 individually, such as in series for example. Alternatively, a plurality of nozzles 60 may be configured to inject liquid shim material 36 into a portion or all of the holes 52 simultaneously.

Because the liquid shim material 36 is configured to move along a path of least resistance, the liquid shim material 36 flows from the outlet of the hole 52, adjacent the second end 46 of the tool 40, directly into the clearance 30 arranged in fluid communication with the hole 52. Liquid shim material 36 is supplied into the clearance 30 through the one or more holes 52 of the tool 40 until the entire clearance 30 is occupied and the liquid shim material 36 is in contact with the opposing surfaces 32, 34 of the first and second component 22, 24, respectively. In such instances, liquid shim material 36 expanding out one or more other sides of the assembly 20 indicates that the clearance 30 is substantially filled with the liquid shim material 36. After the clearance 30 is sufficiently filled with liquid shim material 36, the bond holding the tool adjacent the assembly 20 may be broken, and the tool 40 removed, as shown in block 108.

The tool and method of the present disclosure allows for easy installation of a liquid shim material 36 at an interface 28 without disassembling the components. In addition, installation of the liquid shim material 36 will reduce the vibratory loads transmitted between the first and second component 22, 24 due to the gap 30.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A tool for installing a liquid shim material into a clearance formed between an assembled first component and second component, comprising:

a body having a first end and a second end, the first end includes a planar surface, the second end includes a first surface and a second surface arranged at an angle to the first end and to one another; and at least one hole formed in the body, the at least one hole extending from the first end to a vertex formed at a junction of the first surface and the second surface of the second end and being configured to provide a passageway for the through the body, wherein when the tool is arranged adjacent the assembled first and second component, the passageway formed by the at least one hole is arranged in fluid communication with the clearance.

2. The tool according to claim 1, wherein a diameter of the at least one hole adjacent the first end is greater than or equal to a diameter of an injector nozzle.

3. The tool according to claim 1, wherein a diameter of the at least one hole remains constant between the first end and the second end.

4. The tool according to claim 1, wherein a diameter of the at least one hole varies between the first end and the second end.

5. The tool according to claim 1, wherein the angle between the first surface and the second surface of the second end is generally complementary to an interface between the first component and the second component.

6. The tool according to claim 1, wherein the angle between the first surface and the second surface of the second end is about 90 degrees.

* * * * *